March 12, 1940.        G. S. EDMONSON        2,192,899
LINEAR MOLDED ARTICLE FOR HOUSING ELECTRICAL CONDUCTORS
Filed Jan. 15, 1938        2 Sheets-Sheet 1
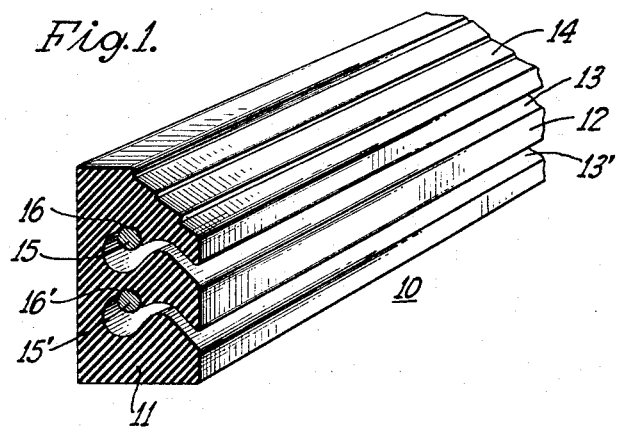
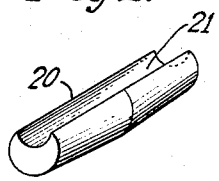
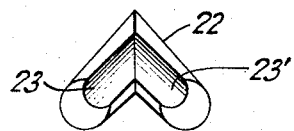
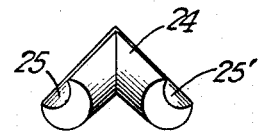
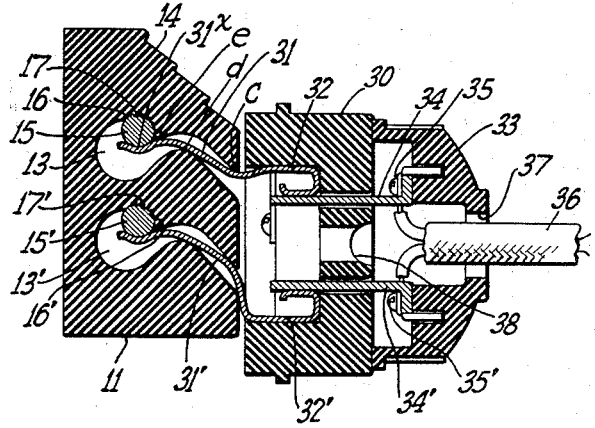
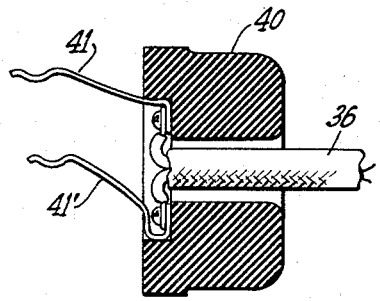
INVENTOR.
George S. Edmonson
BY
Watson, Bristol, Johnson & Leavenworth
ATTORNEYS.

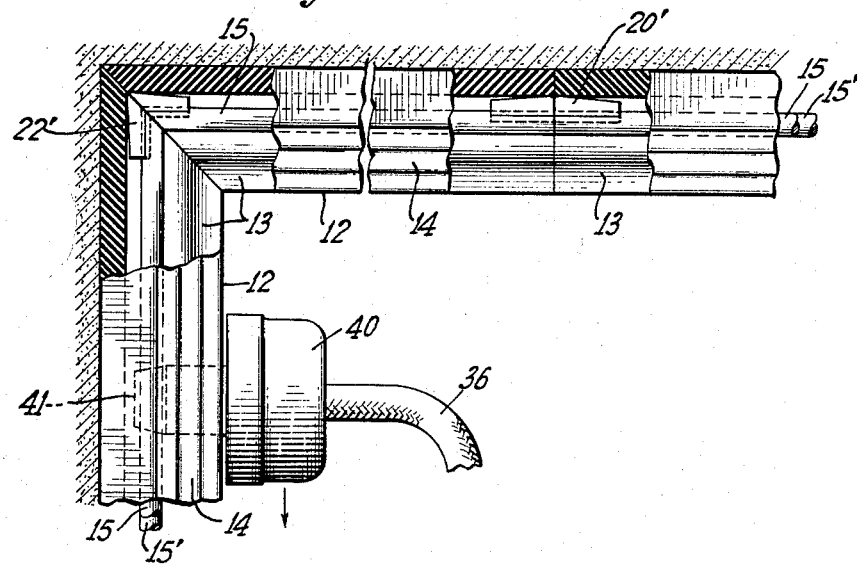
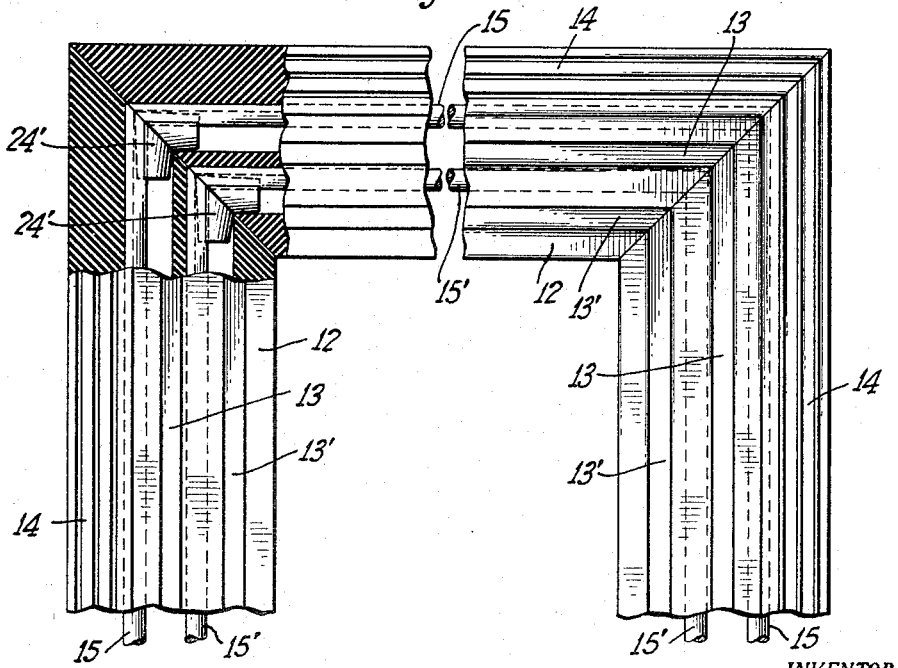

Patented Mar. 12, 1940

2,192,899

UNITED STATES PATENT OFFICE 2,192,899

LINEAR MOLDED ARTICLE FOR HOUSING ELECTRICAL CONDUCTORS

George S. Edmonson, New York, N. Y.

Application January 15, 1938, Serial No. 185,149

3 Claims. (Cl. 173—334.1)

This invention relates to molded articles for housing electrical conductors and the like, which have linearly generated configurations.

The object of the invention is to provide articles of molded plastic material, particularly of a synthetic plastic material, for example, a thermo-plastic or thermo-setting material; such article when molded having a linearly generated configuration of substantially constant cross-section, and preferably contains one or more electrical conductors or metallic inserts.

Another object is to provide molded articles of the character indicated which have a front face with a reentrant portion or longitudinal slot of such shape that it cannot be produced in ordinary molds.

Another object is to provide molded articles of the character indicated which have one face formed with one or more slots, each having an enlargement at the inner end forming longitudinal channels that are adapted to serve in a safe manner as conduits or receptacles for linear metallic bodies, such as electrical conductors.

Another object is to provide an electric bus carrying molding made of a synthetic plastic material, which has the buses partially exposed in open longitudinal channels so that the conductors are engageable at any point along the channels only when a suitable plug or adapter is employed; the molding so provided being suitable for running electrical conductors to any desired point in a room and may be run around corners, door jambs, windows and the like, in a convenient and expeditious manner.

Another object is to provide a plug or adapter to cooperate with the molding whereby current may be taken off from the bus-bars at any desired point.

Another object is to provide a device for connecting sections of the molding one to another whereby the electrical circuit is continued, and to provide means for turning angles whereby the molding may be run around door casings, turn corners, etc.

Other objects of the invention will in part be obvious and will in part appear hereinafter.

The invention accordingly comprises a linear molded article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings, in which:

Fig. 1 is a view showing in perspective a bus carrying molding provided in accordance with the invention;

Fig. 2 is a perspective view of a connector for effecting straight line connections between buses in adjacent sections of molding provided in accordance with the invention;

Fig. 2a is a view similar to Fig. 2, showing a modified form of connector used in sections of molding when joined together to meet at an angle, as in the corner of a room;

Fig. 2b shows still another modified form of connector similar to that shown in Fig. 2a but used for the right-angle construction when adjacent sections are fitted in the same plane about door jambs and the like;

Fig. 3 is a vertical sectional view of a molding provided in accordance with the invention, including an outlet in the form of an adapter which is designed to cooperate with the channels and bus-bars in the molding;

Fig. 4 is a sectional view of a plug for use on the molding shown in Fig. 3 providing an outlet that may be used at any point along the channels of the molding;

Fig. 5 is a perspective view showing sections of molding provided in accordance with the invention mortised to fit in the corner of a room; and Fig. 6 is a view similar to Fig. 5 showing the use of molding of the present invention mortised to fit about a door jamb.

The molding, produced in accordance with the invention, particularly when incorporating electrical conductors, is designed to replace the existing forms of electrical conduits installed in homes, office buildings, factories and the like. The use of conventional sockets and receptacles, and the necessity for predetermining their location is done away with. The moldings of present invention for this purpose are strips having continuous open channel through which access is had at any point. Hence it is seen that a continuous socket, engageable at any point along the path where the molding is installed, is provided. A new molding of conventional form suitable for decorative purposes in connection with the interior trim of a room is thus made available. Adapter and plugs are provided which have fingers of a character adapted to enter the channels and engage with the conductors exposed therein. Electrical outlets are thus available wherever a plug or adapter is inserted. Such plug or adapter may be formed, as hereinafter explained, to afford more than one outlet for current. Multiple sockets are hence unnecessary. The molding here provided is readily mounted on base-boards, walls, ceilings and the like, and is adapted to be made in various colors that harmonize with any color scheme desired. Such molding can also be used in any room where wiring and sockets are already installed by simply running a cord from an ordinary plug to one of my adapters and inserting the adapter into the slots of the molding. Thereafter current can be taken off anywhere along the molding. In effect the molding become a greatly elongated socket. Likewise, wires may be run from any existing wall switch to the molding and current can be taken off anywhere along the molding.

For electrical purposes, the molded strip is preferably made of a plastic material of relatively high dielectric properties, resistant to both heat and moisture. In the process of its fabrication, parallel electrical conductors or bus-bars are rigidly embedded in the molding in the channels formed, becoming thereby integral parts of the molding. These bus-bars are coextensive with the length of the molding which is preferably of some standard length, for example, 2, 4, 6 and/or 8 foot lengths. The several sections are put together so as to form continuous electrical conductors, that complete an electrical circuit, by the provision of suitable connectors, which, without solder or brazing, connect adjacent ends of conductors in conducting relation. By the present invention the connectors employed each consists of a short, solid double tapered metallic plug which enters a lunate space at the inner end of a channel carrying the bus and is adapted to have a rubbing and wedging engagement therewith to insure a positive contact. These may be straight connectors or made in angular form to make connections at mitred joints for turning corners whether interior, exterior or vertical.

The moldings of the present invention, by reason of their linearly generated configuration, have substantially constant cross-sections throughout their lengths and may be formed readily with two or more parallel channels, such as those carrying the electrical conductors which are coextensive with the length of the member. Such channels comprise reentrant portions of the face of the molding and, by reason of the process by which the moldings are made, may be given a form such as would prevent the mold members when made by an ordinary process from being separated so as to permit removal of article when molded. By the present invention, such channels are made as openings of tortuous cross-section whereby dust and moisture are prevented from collecting in them. A cross-section of the molding shows these channels extending from the outer face of the molding to a suitable inner point, having the bus-bars embedded near the inner end. The tortuosity imparts two functions, namely, first: To make it impossible to insert a straight or rigid metallic piece of metal into the channel so as to contact a bus-bar; and second: To impart a lever action by the tortuosity of the channel whereby the resilient fingers of the plug or adapter inserted in the channels are forced to engage the channel in two places simultaneously, thus giving a resultant at a third point which applies force and makes positive contact with the bus-bars when the fingers reach the point of seating, the leverage being exerted by the upper lip of the channel at its outer opening, the bottom of the high point in the tortuous channel and the reentrant surface of the busbar itself.

Referring now to the drawings and particularly to Fig. 1, 10 denotes generally a molded member or strip having a body 11 of molded plastic material, in the front face 12 of which are formed two longitudinally extending channels 13 and 13'. The molding may have any convenient form that is generated by longitudinally moving a plane figure whose boundary has the configuration which it is desired to impart to the molding. The molding here shown has a beveled top-fluting at 14 to impart a desired ornamentation thereto.

The channels 13 and 13' are substantially similar in conformation and parallel and extend the full length of the molding each containing a metallic member, as shown at 15 and 15' which is adapted to conduct an electrical current when the molding serves as an electric conduit.

The process hereinafter more fully described enables the article 10 to be molded and removed from the mold without separating the mold members which impart the desired configuration. Hence, the channels 13 and 13' may have portions which bend back on one another, i. e., comprise cross-sections having a generally tortuous contour or a boundary with a plurality of different curvatures. The specific contour of each of channels 13 and 13' is seen to consist of two leg portions that meet at an obtuse angle, the inner one of which merges into an enlarged terminal portion of lunate form contiguous to the conductor disposed therein.

To support the conductors 15 and 15' in the molding at these terminal portions of the channels, they are scooped out to provide grooves, as shown at 16 and 16'. These grooves are shaped to fit the conductors and are seen to be supplements of the small circles of the lunate openings. The arc through which the molded material engages with each of the conductors is seen to be somewhat less than 180°, in order that the male elements of the mold that form the channels may receive and engage circumferentially about a conductor an arcuate distance somewhat more than 180°, thus avoiding possible displacement in the mold during the molding operation. This partial engagement of the conducting surface by the molded material leaves an ample conducting surface exposed at all points along the containing channel.

To insure against undesired displacement of the conductors 15 and 15' within the channels in the molding itself, or against their being turned in the grooves 16 and 16' each of these conductors are roughened for a portion of the circumference, preferably throughout the entire length, so as to provide them with burrs, as shown at 17 and 17'. This provides surface adhering formations on the conductors which may extend to some extent into the molded material or vice versa, whereby the conductors are securely anchored and prevented from becoming loose.

Where two or more sections of moldings are needed to run conductors to desired points, the sections of the conductors in the molding are joined together to form a continuous conductor by means of connectors of suitable form, for example, as shown in Figs. 2, 2a and 2b, respectively. That shown at 20 in Fig. 2 is a straight double tapered plug of suitable metal, for example, copper, whose top side is scooped out to provide a groove 21 that will fit tightly on a conductor employed such as that at 15. To make the desired connections between conductors in end-to-end relation, a straight plug as shown in Fig. 2 is wedged into the enlarged lunate opening at the inner end of a channel and joins the conductors. This is illustrated at 20' in Fig. 5. Another form of connector is shown at 22 in Fig. 2a and has channel portions 23 and 23' which meet at an angle for joining conductors in sections of molding that go around corners and have front faces meeting in right dihedral angles. Such use is illustrated at 22' in Fig. 5. Still another form of connector is shown at 24 in Fig. 2b. Here the scooped out channels 25 and 25' have portions meeting at an angle in the same plane. Such use is illustrated at 24' in Fig. 6.

From the arrangements illustrated, it is seen that when a connector is inserted in the lunate opening in the end of a molded section, i. e., at the inner end of a channel as at 13 or 13', it is forced against a conductor, such as 15 or 15', and makes tight engagement therewith and continues the electrical conductor into the abutting section of the molding. These connectors are preferably made to have as their outside configuration, the shape of the bottom of the lunate opening, and as their inside, the shape of the exposed surface of a conductor. The taper given to the outside of the plug-connector is such that it may impart a wedging action when placed in the channel and result in a tight engagement with the conductors.

In Fig. 6 two connectors are shown at 24' arranged to connect each of the conductors 15 and 15' in the adjacent sections of molding which are disposed about a door jamb or other casement where right angle turns are made with the front faces of the moldings lying in the same plane.

Adapters and plugs suitable for cooperation with the channels of the present molding are shown respectively in Figs. 3 and 4. Each is provided with fingers especially adapted for insertion in the tortuous parallel channels. Such fingers consist of suitable strips of thin resilient metal, for example, strips of phosphor-bronze of width and thickness affording a circular mill measurement sufficient to carry the desired current. A pair of such fingers are mounted on a base and are shaped and disposed at angles so as to extend into the channels, such as 13 and 13', and make contact with the conductors, such as 15 and 15'.

In Fig. 3 an adapter having strips formed into suitable fingers is shown. Here an insulating base 30 has rigidly mounted on it a pair of similar substantially parallel fingers 31 and 31'. In order suitably to mount fingers 31 and 31' in the base of the adapter, the fingers have conducting base sections 32 and 32' which are secured in the base and are adapted for engagement by the fingers of a suitable appliance plug, for example, a conventional plug with a base, such as shown at 33. Base 33 is of insulating material and has fingers 34 and 34' the spacing of which is preferably that of conventional plugs. The fingers 34 and 34' have screws 35 and 35' which afford means for securing thereto the bared end-wires of a lamp-cord or cable, as shown at 36. Here a lamp-cord is inserted through opening 37 in the base 33. The adapter base 30 may also be formed to admit the direct attachment of a lamp-cord. An example of a suitable formation is here illustrated and consists of a pair of oppositely extending radial grooves 38 scooped out from the outer face of the adapter, which permit the insertion of the wires of a lamp-cord so that they may be made fast respectively to the conducting sections 32 and 32'. In this way an adapter may be arranged to serve as a multi-opening plug for external distributing conductors running to household appliances. By such arrangements the external conductors are readily brought into conducting relation with the bus-bars 15 and 15'.

In Fig. 4 a simple plug is shown which has resilient fingers of a character adapted for channel entry. Here an insulating base 40 is shown with such fingers at 41 and 41'. These fingers are like those at 31 and 31' and are relatively straight but sloped upwardly from the base at an angle conforming with the slant of an outer leg of a channel such as shown at 13 or at 13'.

The free end of each of the resilient fingers, such as shown at 31 and 31', and at 41 and 41', is provided with a concave terminal portion. An example of such concave formation is shown at $31^{x}$ in Fig. 3. This concavity is shaped to be complementary to the exposed face of the conductor with which it engages. In achieving this, the extreme end of each of the resilient fingers 31, 31', 41 and 41' may be either bent back, or faced off by suitable means, as by filing, so as to give a shoe-like effect that makes the passage of the tip easy when it extends through the tortuous entry of a channel to a bus-bar and rubs past it to the final seat.

The unique utility of this combination of plug, or of adapter and plug, with the channels here provided is the result of the use of the resilient fingers which permits of their conforming themselves to the tortuous channel formations. This is the more apparent when it is noted that such channels cannot be made by the ordinary processes of molding where the pressure is exerted on the face of the molding, as the male element of a mold having laterally separated members, when entering into the matrix element to form a tortuous slot or channel, could not be withdrawn thereafter because of the offsets embodied in the curve or curves of the slot or channel. The product, after setting, could not in such case be removed from the mold.

Where the channel formation consists of two legs that meet at an obtuse angle, the resilient finger when inserted in the tortuous channel is caused to bend and engage with the formation, including the conductor, at three points. Such points are shown in the drawings by way of example at c, d and e in Fig. 3. Of the outer points c and d, one serves as a fulcrum so that the finger exerts a lever action which acts to apply force at the innermost point e; such force making the concave terminus of the finger bear hard upon the conductor and thereby insure a positive contact.

My copending application, Serial No. 185,150, filed January 15, 1938, discloses a machine for making molded articles of the character herein disclosed, together with a cycle of steps adapted for the making of the molding of the present invention.

The molding here provided is seen to afford a new accessory to the electrical trade, whereby electrical conductors may be run to desired points in connection with either old or new electrical installations and at a relatively small cost. It will also be seen such installations may be made in a relatively short period of time requiring relatively little skill to achieve an installation that conforms in all substantial particulars with underwriters' codes and the like.

Since certain changes in the article which embody the invention may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. As an article of manufacture, a rigid molded longitudinal strip of a synthetic plastic material formed to have a substantially constant cross-section and with a front face, said front face being provided with a longitudinally extending rigidly formed slot leading inwardly to and communicating with an enlarged internal channel, said channel having a bus bar adapted to conduct an electrical current secured to a wall thereof, said slot being substantially V-shaped in cross-section; the arrangement of the knee of said V-shaped slot and the position of said bus bar with respect to said knee being such that the take-off finger of an adaptor or plug when inserted is flexed and clampingly engages with the walls of said slot and contacts said bus bar with an increased pressure.

2. As an article of manufacture, a rigid molded longitudinal strip of a synthetic plastic material having a substantially constant cross-section and formed with a front face and with an internal channel extending concurrently with the length of said strip and having a substantially circular cross-section, said front face being provided with a longitudinally extending slot leading inwardly to and communicating with said channel, which latter is relatively enlarged with respect to the width of said slot, and a cylindrical metallic conductor provided with an adhering formation on its surface disposed and embedded in a wall of said channel, said wall embracing circumferentially an angular distance about said conductor less than 180°; the construction and arrangement being such that a double conical connector plug of lunate cross-section may be inserted snugly in the ends of the channel and forced into tight engagement with the conductor to effect a continuous electrical conductor between adjacent molded strips and insure against twisting and the lateral displacement of such strips.

3. As an article of manufacture, a rigid molded longitudinal strip of a synthetic plastic material having a substantially constant cross-section and formed with a front face and with a plurality of internal channels extending concurrently with the length of said strip and having substantially circular cross-sections, said front face being provided with a corresponding number of longitudinally extending rigidly formed slots leading inwardly to and communicating with said channels, each of said slots being tortuous in cross-section and disposed in stereo-parallelism throughout the strip and of a width which is relatively narrow with respect to the width of the channel with which it communicates, which latter is relatively enlarged with respect to the width of said slot, and a cylindrical metallic conductor provided with an adhering formation on its surface disposed and embedded in a wall of each of said channels, said wall embracing circumferentially an angular distance about each of said conductors which is less than 180°; the arrangement of the interior contour of said tortuous slots and the position of said metallic conductors with respect thereto being such that the take-off fingers of an adaptor or plug when inserted are flexed and clampingly engage with the contours of said slots and contact said metallic conductors with increased pressures.

GEORGE S. EDMONSON.